United States Patent Office 2,830,977
Patented Apr. 15, 1958

2,830,977

PREPARATION OF AN IMPROVED ALUMINUM BROMIDE CATALYST

Augustus B. Small and John L. Ernst, Baton Rouge, La., assignors to Esso Research and Engineering Company, a corporation of Delaware No Drawing. Application June 24, 1953
Serial No. 363,945

5 Claims. (Cl. 260—85.3)

This invention relates to the preparation of an aluminum bromide catalyst and relates more particularly to the preparation of an improved dissolved aluminum bromide catalyst suitable for hydrocarbon reactions.

The use of an aluminum bromide as a catalyst for various hydrocarbon reactions is well known. This catalyst is particularly well suited for alkylation, isomerization, polymerization, copolymerization and the like reactions.

A particularly suitable reaction for the use of aluminum bromide is the copolymerization of a major proportion of an iso-olefin and a minor proportion of a diolefin, such as isoprene or butadiene at temperature below —50° C. in the presence of a solvent both for the monomers and for the polymer. In such a system the aluminum bromide is introduced as a solution in a paraffin hydrocarbon such as normal heptane, naphtha, and the like. This solution is usually prepared by agitating solid aluminum bromide in the solvent to obtain a catalyst concentration of about 0.86 gram aluminum bromide per 100 cc. solvent. During the preparation of this solution, a considerable quantity of sludge forms. This sludge is insoluble in the solvent and represents a loss of the major portion of the aluminum bromide.

When a catalyst, prepared as described above is used to catalyze hydrocarbon reactions erratic results are obtained with regard to polymer quality which indicate that the activity of the catalyst is affected by certain unknown factors. Attempts to standardize the quality of the catalyst by standardizing the conditions under which it is prepared and by storing it at very low temperatures, e. g. —80° C., have proved unsuccessful.

It has now been found that the above disadvantages may be overcome by the use of an improved technique for preparing the aluminum bromide solution.

According to the invention the hydrocarbon solvent is passed through a body of solid powdered aluminum bromide at a temperature below —20° C. The concentration of aluminum bromide in the solution may be controlled by controlling the contact temperature. The solution is then immediately contacted with the hydrocarbon feed mixture. When the catalyst, so prepared, is to be used to catalyze the copolymerization of a major proportion of isobutylene and a minor proportion of a diolefin, such as isoprene, the feed mixture will desirably contain 55–90%, preferably 60–80%, by weight of reactants, the balance being primarily a hydrocarbon solvent preferably the same solvent used in preparing the catalyst.

The solvent to be used as the catalyst solvent and reaction diluent is preferably a hydrocarbon liquid of 4 to 8 carbon atoms, and preferably should be free of aromatic and unsaturated constituents. The preferred materials are the paraffin hydrocarbons in which the number of carbon atoms is $M/10-(1$ to $2)$ where M is the percent of monomers. Thus the particular solvent to be used for best results may vary according to the percent of monomers being used.

In carrying out the copolymerization the iso-olefin to be used should have 4 to 5 carbon atoms; the preferred iso-olefin is isobutylene. The aliphatic diolefin should preferably have 4 to 6 carbon atoms. Examples of suitable materials include butadiene, isoprene, piperylene, 2-methyl pentadiene, dimethyl butadiene, etc. The amount of diolefin to be used may vary somewhat; for butadiene, about 20 to 80% based on olefin should be used because it is difficult to make it copolymerize with the isobutylene, but for isoprene and the other diolefins, generally about 1 to 10% based on olefin should be used.

The temperature at which the copolymerization is carried out should be below about —50° C. and should be sufficiently lower to permit production of polymer having the desired molecular weight. The concentration of aluminum bromide in the solvent should be about 0.1 to 1.5 grams per 100 ml. of solvent and the total amount used should be about .05 to .006% based on reactants.

The resulting polymer may be recovered from the reaction liquid according to any desired method, such as by directly injecting the entire reaction mixture into hot water to vaporize the solvent and precipitate the polymer in the form of fine particles which may be recovered by filtration or other suitable means or the cold reaction liquid may be first passed countercurrent to the incoming feed by heat exchange.

The following examples are offered to illustrate certain features of the invention, and it will be understood that all of the specific conditions and limitations given are not necessarily co-extensive with the broad scope of the invention as defined in the claims.

*Example I*

Three and one-half liters of naphtha and 30 grams of aluminum bromide were mixed at —20° C. yielding a concentration of 0.86 gram of aluminum bromide per 100 cc. naphtha. The catalyst solution was stored at —20° C. for several days. Samples of this solution were periodically withdrawn and used to copolymerize a feed mixture consisting of 98% by wt. of isobutylene and 2% by wt. of isoprene in the presence of n-heptane as the diluent.

The concentration of the catalyst in each sample and the Mooney viscosity of the product obtained with each sample were determined. The following results were obtained:

| Days Stored | Catalyst Concentration, g. AlBr$_3$/100 cc. Solvent | Max. Mooney Vis. of Product (8 Min. Values) |
|---|---|---|
| 1 | 0.53 | 61. |
| 7 | 0.39 | 42. |
| 12 | 0.30 | No polymer formed. |

*Example II*

Solutions of aluminum bromide were prepared in n-heptane and naphtha as described in Example I and stored at —20° C. for 145 hours and then cooled to —80° C., and stored for an additional 71 hours after which the solution was warmed to room temperature (20° C.) and kept at that temperature for 99 hours. Samples one inch from the top and one inch from the bottom of each solution were withdrawn periodically and titrated with 0.1 N NaOH to determine the catalyst concentration. The following results were obtained:

| Catalyst Conc. (g./100 cc.) dissolved in— | at −20° C. | | | | at −80° C. | | at +20° C. |
|---|---|---|---|---|---|---|---|
| | 30 | 49 | 79 | 145 | 23 | 47 | 71 |
| Naphtha (as received): | | | | | | | |
| Sample from top | 0.27 | 0.34 | 0.46 | 0.62 | 0.44 | 0.42 | [1] 0.44 [1] 0.26 |
| Sample from bottom | 0.52 | 0.71 | 1.12 | 0.62 | 0.46 | 0.42 | |
| Naphtha (dried): | | | | | | | |
| Sample from top | | 0.58 | 0.54 | 0.52 | 0.90 | 0.90 | [1] 0.86 [1] 0.72 |
| Sample from bottom | 0.58 | 0.62 | 0.56 | 0.52 | 0.92 | 0.92 | |
| N-heptane (as received): | | | | | | | |
| Sample from top | 0.47 | 0.50 | 0.56 | 0.56 | 0.76 | 0.72 | [1] .86 [1] 0.66 |
| Sample from bottom | 1.06 | 0.62 | 0.56 | 0.56 | 0.80 | 0.74 | |
| N-heptane (dried): | | | | | | | |
| Sample from top | | 0.56 | 0.66 | 0.76 | | 0.78 | [1] 0.74 [1] 0.36 |
| Sample from bottom | 0.48 | 0.56 | 0.70 | 0.76 | | 0.76 | |

[1] Sample taken from middle.

The above examples clearly show that the concentration of catalyst in the hydrocarbon solution varies with length of storage time and also that the quality of the product obtained falls off with storage time. On the other hand the improved technique of the present invention affords a means of preparing the catalyst in just sufficient quantities so that it can be used immediately without any possibility of deterioration due to storage or other factors.

While the above catalyst has been described in connection with the preparation of butyl rubber by the copolymerization of a major proportion of isobutylene with a minor proportion of isoprene, it may also be used in the copolymerization of other hydrocarbons such as isobutylene or diisobutylene with aromatic hydrocarbons such as benzene, toluene, or styrene, the homopolymerization of isobutylene, the alkylation of isoparaffins and olefins, the isomerization of normal paraffins to isoparaffins, etc.

The nature of the present invention having thus been fully set forth, what is claimed as new and useful and desired to be secured by Letters Patent is:

1. A process for preparing synthetic rubber which consists essentially in passing a paraffin hydrocarbon solvent of 4 to 8 carbon atoms through a body of powdered solid aluminum bromide at a temperature of about −20° C. to provide a catalyst solution of about 0.1 to 1.5 grams of aluminum bromide per 100 ml. of said hydrocarbon solvent, and immediately, without storage, contacting said catalyst solution at a temperature below −50° C. with a polymerization feed liquid consisting essentially of about 55 to 90% reactants consisting of a major proportion of isobutylene and a minor proportion of diolefin of 4 to 6 carbon atoms, said polymerization feed also containing about 45 to 10% of a paraffin hydrocarbon solvent of 4 to 8 carbon atoms, whereby catalyst deterioration and erratic catalytic results are avoided.

2. A process for preparing synthetic rubber which consists essentially in passing a paraffin hydrocarbon solvent of 4 to 8 carbon atoms through a body of powdered solid aluminum bromide at a temperature of about −20° C. to provide a catalyst solution of about 0.1 to 1.5 grams of aluminum bromide per 100 ml. of said hydrocarbon solvent, and immediately, without storage, contacting said catalyst solution at a temperature below −50° C. with a polymerization feed liquid consisting essentially of about 55 to 90% reactants consisting of a major proportion of an iso-olefin of 4 to 5 carbon atoms and a minor proportion of diolefin of 4 to 6 carbon atoms, said polymerization feed also containing about 45 to 10% of a paraffin hydrocarbon solvent of 4 to 8 carbon atoms, whereby catalyst deterioration and erratic catalytic results are avoided.

3. Process according to claim 2 in which the iso-olefin is isobutylene and the diolefin is isoprene.

4. Process according to claim 3 in which the isobutylene is used in amounts by weight of 90 to 99% and the isoprene in amounts of 1 to 10%.

5. Process according to claim 4 in which the solvent is a saturated hydrocarbon having approximately a number of carbon atoms represented by the expression $M/10-(1 \text{ to } 2)$, where $M$ is the percent of monomers.

References Cited in the file of this patent

UNITED STATES PATENTS

| | | |
|---|---|---|
| 2,356,128 | Thomas | Aug. 22, 1944 |
| 2,488,736 | Palmer | Nov. 22, 1949 |
| 2,515,138 | Schutze | July 11, 1950 |
| 2,519,100 | Baldwin | Aug. 15, 1950 |